United States Patent
Mery et al.

(10) Patent No.: US 6,250,440 B1
(45) Date of Patent: Jun. 26, 2001

(54) SHEAR-DAMPED DISC BRAKE

(75) Inventors: Jean-Claude Mery, Pavillon-ss-Bois; Jean-Pierre Boisseau, Paris, both of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,988

(22) PCT Filed: Mar. 16, 1999

(86) PCT No.: PCT/FR99/00598

§ 371 Date: Apr. 5, 1999

§ 102(e) Date: Apr. 5, 1999

(87) PCT Pub. No.: WO99/49231

PCT Pub. Date: Sep. 30, 1999

(30) Foreign Application Priority Data

Mar. 23, 1998 (FR) .................................................. 98 03519

(51) Int. Cl.$^7$ ...................... F16D 65/095; F16D 55/2265
(52) U.S. Cl. .................................... 188/73.44; 188/73.39; 188/73.31
(58) Field of Search ................................ 188/73.44, 73.45, 188/73.31, 73.1, 73.39, 205 R, 206 R, 72.4, 71.1

(56) References Cited

U.S. PATENT DOCUMENTS

| | | | |
|---|---|---|---|
| Re. 32,470 | * 8/1987 | Wright ............................. | 188/73.44 |
| 3,416,634 | * 12/1968 | Swift . | |
| 3,964,581 | * 6/1976 | Habgood . | |
| 4,082,166 | * 4/1978 | Ritsema . | |
| 4,335,806 | * 6/1982 | Lüpertz ............................. | 188/73.39 |
| 4,410,068 | * 10/1983 | Schreier et al. .................. | 188/73.44 |
| 4,410,069 | * 10/1983 | Schreier et al. .................. | 188/73.44 |
| 4,533,025 | * 8/1985 | Carre ................................. | 188/73.44 |
| 4,560,037 | * 12/1985 | Gumkowski et al. . | |
| 4,650,039 | * 3/1987 | Weiler et al. ..................... | 188/73.44 |
| 5,323,882 | * 6/1994 | Waterman et al. . | |
| 5,343,985 | * 9/1994 | Thiel et al. ....................... | 188/73.39 |
| 5,551,537 | * 9/1996 | Mery et al. ....................... | 188/73.39 |
| 5,564,532 | * 10/1996 | Baba et al. ....................... | 188/73.39 |
| 6,039,155 | * 3/2000 | Demoise, Jr. .................... | 188/73.39 |

FOREIGN PATENT DOCUMENTS

| | | | |
|---|---|---|---|
| 2934219 | * 4/1981 | (DE) . | |
| 3729154 | * 4/1988 | (DE) . | |
| 4028951 | * 3/1991 | (DE) . | |
| 2128277 | * 4/1984 | (GB) ............................... | 188/73.44 |
| 0142464 | * 11/1979 | (JP) ................................. | 188/73.44 |
| 0119235 | * 9/1980 | (JP) ................................. | 188/73.44 |
| 1260582 | * 9/1986 | (SU) ............................... | 188/73.39 |
| 9424452 | * 10/1994 | (WO) . | |
| 9641966 | * 12/1996 | (WO) . | |

* cited by examiner

Primary Examiner—Douglas C. Butler
(74) Attorney, Agent, or Firm—Leo H. McCormick, Jr.; Warren Constock

(57) ABSTRACT

A sliding caliper disc brake for a motor vehicle having a disc, a carrier (2), a caliper (3) and pads (52). The carrier (2), respectively, provides bearing surfaces (61b, 63b) for the caliper (3) and pads (52) having a non-zero angle (Ab) which opposes rotational movement between the caliper (3) and pads (52) when the disc turns in a direct sense (D). Thus, a resistance to a braking torque generated during braking is dampened by a shear force developed between the caliper (3) and pads (52).

7 Claims, 3 Drawing Sheets

SHEAR-DAMPED DISC BRAKE

The present invention relates to a disc brake for a motor vehicle.

More specifically, the present invention relates to a disc brake of the type which comprises: a disc which has an inboard face and an outboard face, this disc rotating about a transverse axis in a direct sense of rotation when the vehicle is travelling forward; a carrier comprising an upstream branch and a downstream branch straddling the disc and secured to a common base which is fixed to the vehicle facing the inboard face of the disc, the downstream branch following on from the upstream branch in the direct sense of rotation of the disc, and each branch having an inboard housing and an outboard housing which are situated one on each side of the disc; a caliper straddling the disc and mounted so that it can slide relative to the carrier in a transverse direction parallel to the transverse axis, this caliper comprising a jaw facing towards the outboard face of the disc, and a cylinder facing towards the inboard face of the disc and closed by a piston; guide means provided on the carrier and on the caliper and comprising a bore and a pin sliding in the bore; and a pair of friction pads, this pair being formed of an inboard pad and an outboard pad placed respectively, in the transverse direction, between the piston and the inboard face of the disc, and between the outboard face of the disc and the jaw of the caliper, the inboard pad having an upstream end and a downstream end which are mounted so that they can slide in respective inboard housings in the upstream and downstream branches, and the outboard pad having an upstream end and a downstream end which are mounted so that they can slide in the respective outboard housings of the upstream and downstream branches, the inboard and outboard pads carrying, between their respective ends, respective friction linings facing towards the inboard and outboard faces of the disc and by means of which each pad is urged by the disc in the direct sense of rotation in the event of braking while the vehicle is travelling forward.

BACKGROUND OF THE INVENTION

Disc brakes of this type are well known in the prior art, as shown, for example, in Patent documents PCT/FR96/00615, PCT/FR94/00174, and EP-0,694,133.

One of the many problems which arise when designing disc brakes lies in the difficulty of absorbing the drag forces transmitted to the pads by the disc, without the carrier deformations which necessarily result from this causing resistance that opposes the satisfactory sliding of the caliper relative to the carrier, as such a resistance itself generates abnormal and uneven wear of the pads, risks of brake seizure, increases in brake-fluid absorption, noise, etc.

SUMMARY OF THE INVENTION

The invention falls within this context and its object is to propose a disc brake capable of absorbing the dragging forces transmitted to the pads by the disc by converting them into shear forces.

To this end, the brake of the invention which in other respects conforms to the above preamble, is essentially characterized in that the pin is a single pin and lies on a mid-plane of the caliper, in that the downstream branch of the carrier and the jaw of the caliper have first and second respective contact surfaces capable of coming to bear one on the other in a first oblique plane, in that the downstream branch of the carrier and at least one of the inboard and outboard pads have third and fourth respective contact surfaces capable of coming to bear one on the other in a second oblique plane, and in that the first and second oblique planes form a non-zero angle between them.

The disc brake of the invention may also advantageously comprise a spring bearing on the outboard pad and on the jaw of the caliper and exerting an elastic torque tending to make the caliper turn in the direct sense of rotation relative to the outboard pad.

In one possible embodiment of the invention, the upstream end of at least one of the inboard and outboard pads is attached to the upstream branch of the carrier.

As a preference, the downstream branch of the carrier has a pair of first contact surfaces forming a dihedron of mutual contact between this downstream branch and the jaw, and a pair of third contact surfaces forming a dihedron of mutual contact between this downstream branch and the first pad.

In this way, the jaw of the caliper may have, facing the downstream branch of the carrier, a pair of second contact surfaces, each of which is capable of coming to bear on the dihedron of mutual contact between the downstream branch of the carrier and the jaw.

Likewise, the downstream end of the first pad may have a pair of fourth contact surfaces, each of which is capable of coming to bear on the dihedron of mutual contact between the downstream branch of the carrier and this first pad.

Finally, it may also be advantageous to contrive for the angle formed between the first and second oblique planes to be at least equal to 45 degrees.

Further features and advantages of the invention will emerge clearly from the description thereof given hereafter by way of non-limiting indication with reference to the appended drawings.

DETAILED DESCRIPTION OF THE INVENTION

Figure 1:
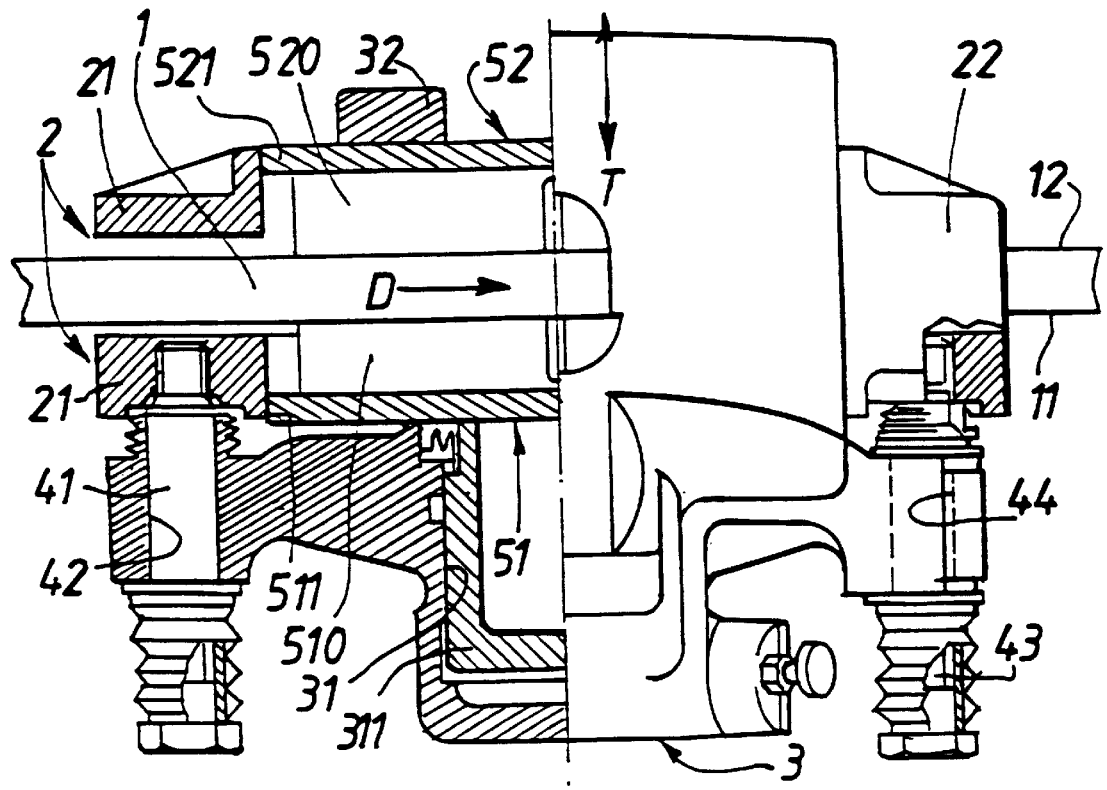
FIG. 1 is a view from above and in part section of a known disc brake, of the type to which the present invention applies.
Figure 2:
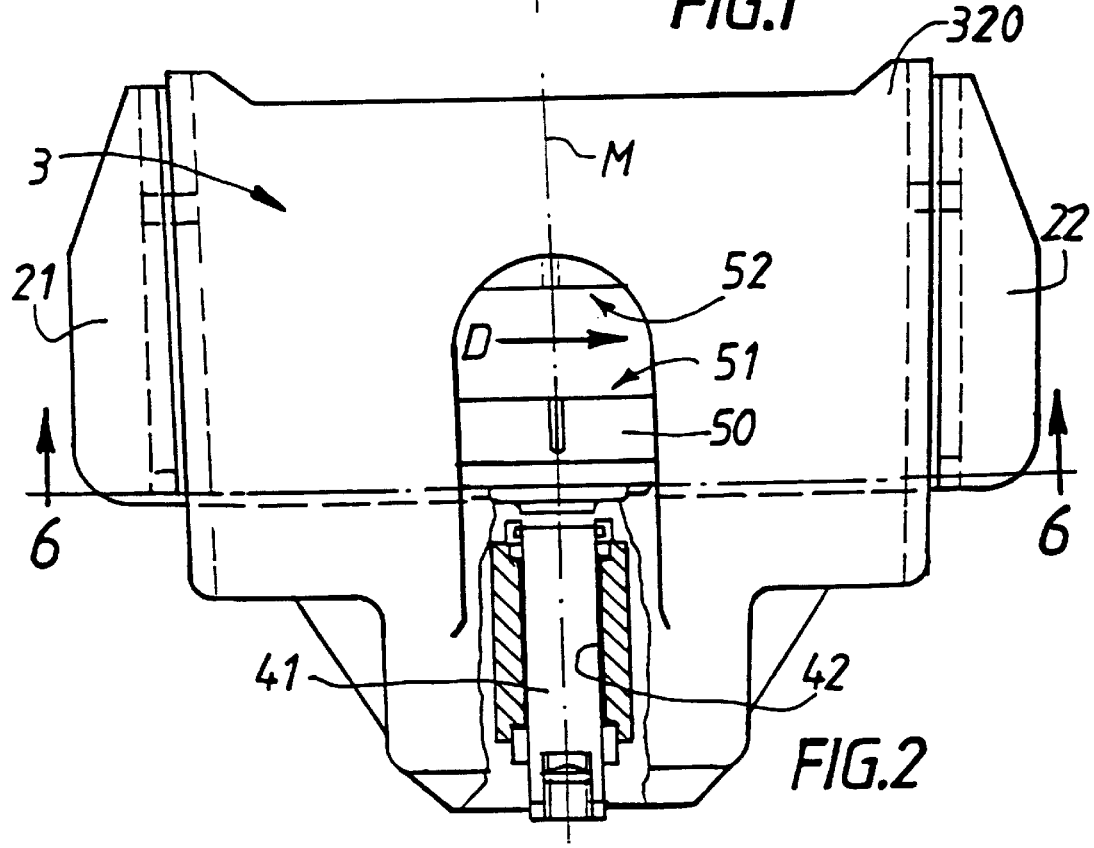
FIG. 2 is a view from above and in part section of a disc brake in accordance with the present invention.

As FIG. 1 shows, the invention applies to a disc brake for a motor vehicle, of the type which comprises, in the known way, a disc 1, a carrier 2, a caliper 3, guide means 41, 42, 43, 44 provided on the carrier 2 and on the caliper 3, and a pair of friction pads which is formed of an inboard pad 51 and an outboard pad 52.

Figure 3:
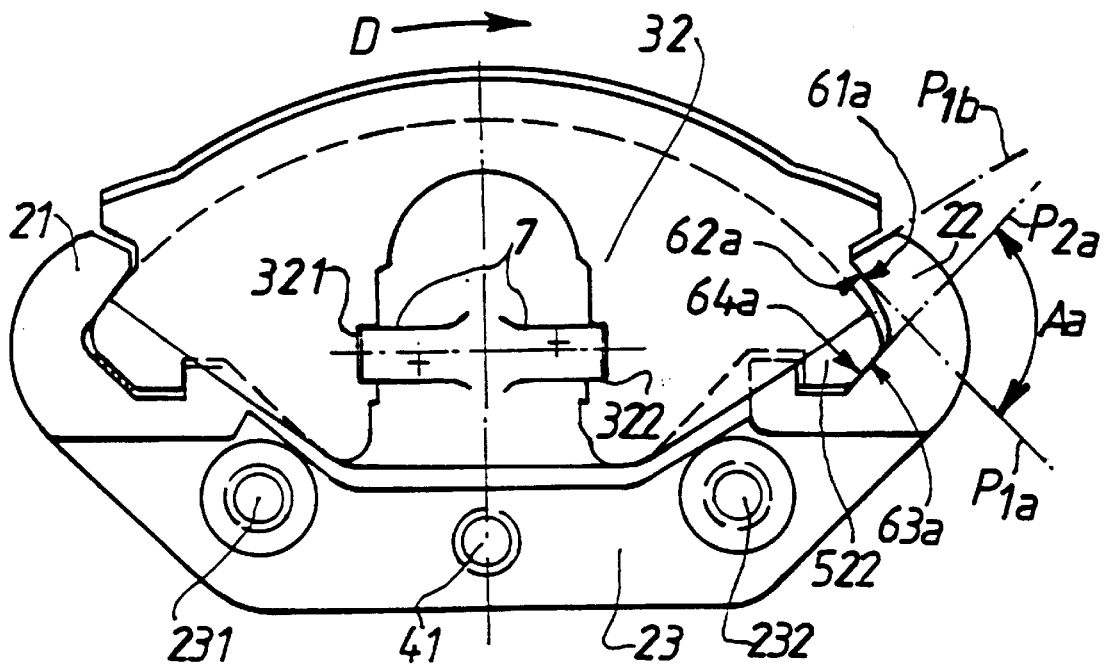
FIG. 3 is a front-on view of a disc brake in accordance with the invention, seen from the outside of the vehicle which it is mounted.
Figure 4:
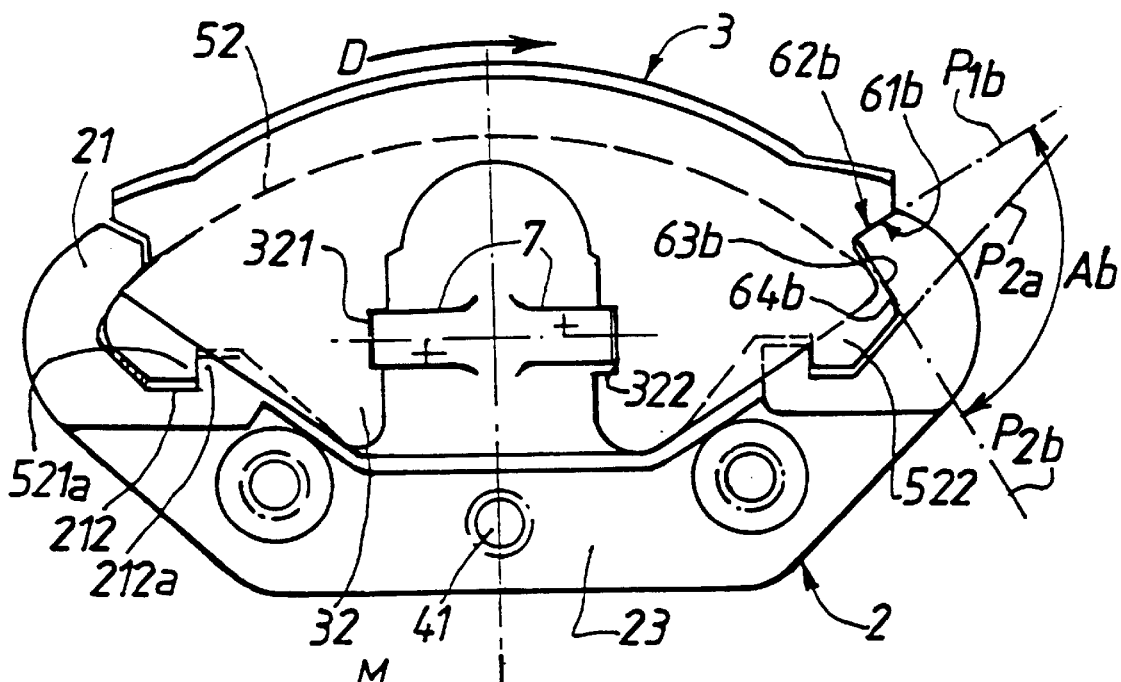
FIG. 4 is a view similar to FIG. 3, representing the brake in another condition.

For reasons of clarity, the disc is assumed to turn from left to right in all the figures, which means that if FIGS. 1, 2, 5 and 6 are assumed to depict a brake mounted on the left-hand side of a vehicle, then FIGS. 3 and 4 must be considered as depicting a brake mounted on the right-hand side of this vehicle.

The disc 1 has an inboard face 11 and an outboard face 12 and is rotated, with a wheel of the vehicle, about a transverse axis X in a direct sense of rotation D when the vehicle is travelling forward.

The carrier 2 comprises an upstream branch 21 and a downstream branch 22 which both straddle the disc 1 and which are secured to a common base 23 of the carrier, the latter being fixed to the vehicle facing the inboard face 11 of the disc, for example by means of bolts inserted in orifices 231 and 232.

By convention, the downstream branch 22 is here defined as being the one which follows on from the other, known as the "upstream branch 21" in the direct sense of rotation D of the disc.

Figure 5:
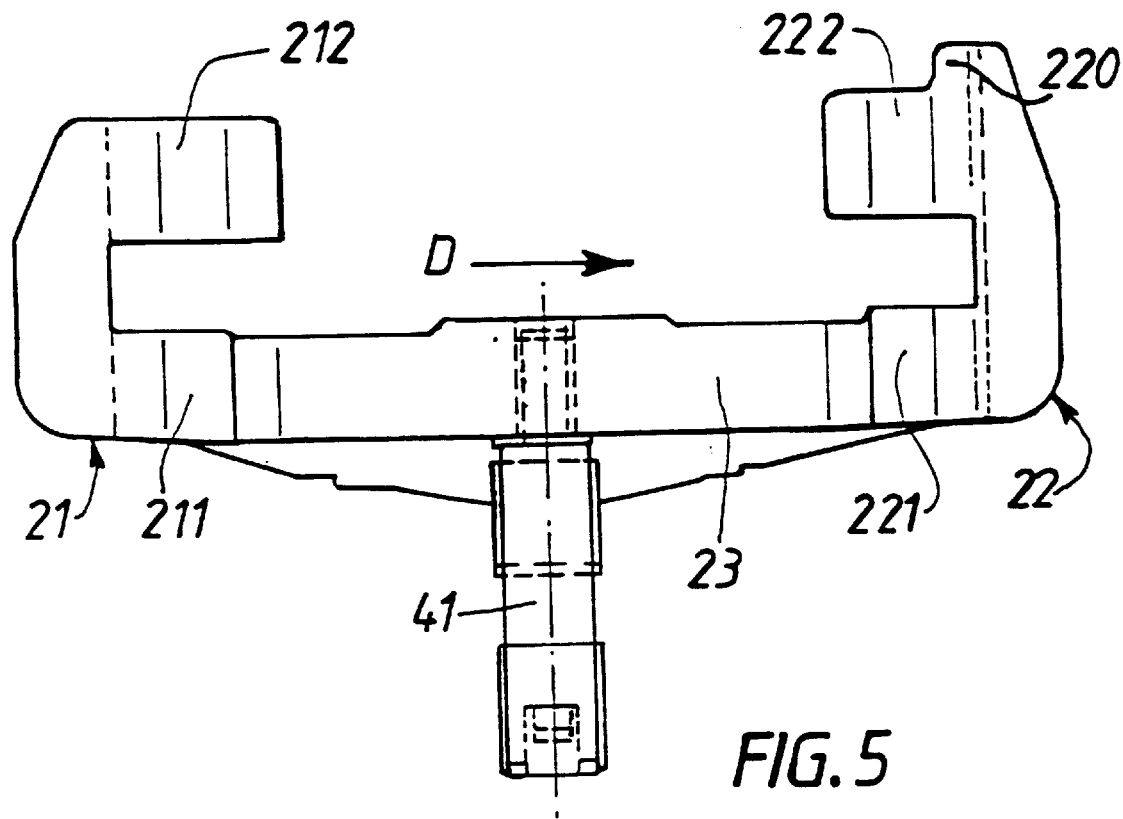
FIG. 5 is a view from above of a carrier of a disc brake in accordance with the invention.
Figure 6:
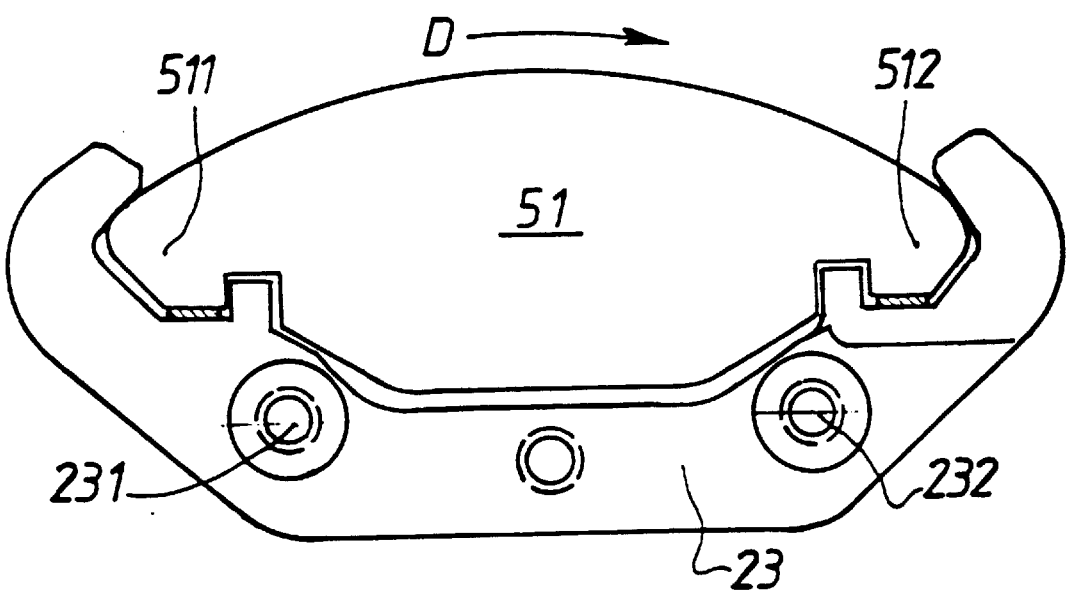
FIG. 6 is a front-on view of a disc brake in accordance with the invention, observed from the angle identified by arrows 6—6 in FIG. 2.

Furthermore, as best shown in FIG. 5, each branch has an inboard housing 211, 221 and an outboard housing 212, 222, the inboard and outboard housings lying one on either side of the disc 1.

The caliper 3, which straddles the disc 1 also, is mounted so that it can slide relative to the carrier 2, in a transverse direction T parallel to the transverse axis X.

This caliper 3, which acts as a gripper, essentially comprises a jaw 32 pointing towards the outboard face 12 of the disc, and a cylinder 31 lying on the same side as the inboard face 11 of the disc and closed by a piston 311.

The guide means 41, 42, 43 and 44 are formed in pairs, each pair comprising a bore and a pin mounted so that it can slide in this bore.

In the prior art illustrated in FIG. 1, the guide means 41 and 43 provided on the carrier consist of two pins, the guide means 42 and 44 provided on the caliper 3 then consisting of two bores.

The inboard pad 51 is placed, in the transverse direction T, between the piston 311 and the inboard face 11 of the disc, and has an upstream end 511 and a downstream end 512 which are mounted so that they can slide in the respective inboard housings 211, 221 of the upstream and downstream branches 21, 22.

Similarly, the outboard pad 52 is placed between the outboard face 12 of the disc and the jaw 32 of the caliper, and has an upstream end 521 and a downstream end 522 which are mounted so that they can slide in respective outboard housings 212, 222 of the upstream and downstream branches 21, 22.

Moreover, the inboard and outboard pads 51, 52 carry, between their respective ends, friction linings 510, 520, the lining 510 of the inboard pad facing towards the inboard face 11 of the disc 1, and the lining 520 of the outboard pad facing towards the outboard face 12 of the disc.

When pressurized brake fluid is injected into the cylinder 31 and pushes the piston 311 towards the disc 1, this piston presses the pad 51 against the inboard face 11 of the disc, the result of which is that the cylinder 31 is forced away from the disc until the jaw 32 presses the outboard pad 52 onto the outboard face 12 of the disc with an equivalent force.

If, during this operation, the vehicle is travelling forwards, the pads 51 and 52 therefore receive from the disc, and via their linings 510 and 520 which rub on the latter, a force which urges them in the direct sense of rotation D and which has to be absorbed by the carrier 2, the purpose of the invention being precisely to propose special means for facilitating this absorption.

To this end, the brake of the invention comprises just one pair of guide means, that is to say a single pin 41 sliding in a single bore 42, it being possible for the pin 41 and the bore 42 to be provided on the carrier and on the caliper respectively or vice versa with equal ease, provided that they are placed in the mid-plane of the caliper 3, that is to say in the plane which, in scenarios in which the brake comprises just one single central piston as illustrated, consists of the plane of the line M passing through the axis X of rotation of the disc and through the axis of symmetry of revolution of the piston 311.

Furthermore, the downstream branch 22 of the carrier and the jaw 32 of the caliper have first and second respective contact surfaces such as 61a, 62a in FIG. 3, and 61b, 62b in FIG. 4, which when the brake is actuated can come to bear one against the other in a first oblique plane such as P1a in FIG. 3 and P1b in FIG. 4.

Also, the downstream branch 22 of the carrier and at least one of the pads, for example the outboard pad 52, have third and fourth respective contact surfaces such as 63a, 64a in FIG. 3, and 63b, 64b in FIG. 4, which when the brake is actuated, can come to bear one on the other in a second oblique plane such as P2a in FIG. 3, and P2b in FIG. 4.

Finally, as FIGS. 3 and 4 show, the first and second oblique planes such as P1a and P2a, or P1b and P2b, form a non-zero angle such as Aa or Ab between them, preferably at least equal to 45 degrees.

A spring 7, for example fixed to the outboard pad 52 and bearing in notches 321 and 322 of the jaw 32 of the caliper, is preferably designed to exert an elastic torque tending to make the caliper 3 turn in the direct sense of rotation D relative to the outboard pad 52.

An examination of FIGS. 3 and 4, which deal with the same brake observed in different phases of braking, allows a better understanding of the invention.

As shown in FIG. 3, which corresponds to actuation of the brake with a low braking torque, the caliper is forced, if driven in the direct sense of rotation indicated by the arrow D, to follow a rotational movement in this direct sense D by the bearing of the contact surface 62a on the contact surface 61a, while the outboard pad 52 is forced, if driven in the direct sense D, to follow a rotational movement in the opposite sense to this direct sense D by the bearing of the contact surface 64a on the contact surface 63a.

However, as the caliper 3 grips the outboard pad 52, it actually has a pronounced tendency to follow the movements of this pad.

This being the case, the natural driving of the caliper 3 by the pad 52 and the opposing effects of the caliper 3 and of the outboard pad 52 bearing on the carrier 2 generate a shear force between the caliper 3 and the pad 52, and this results in easier absorption of the braking torque.

Likewise, as shown by FIG. 4 which corresponds to brake actuation with a high braking torque, the caliper is forced, if driven in the direct sense of rotation indicated by the arrow D, to follow a rotational movement in the opposite sense to the direct sense D by the bearing of the contact surface 62b on the contact surface 61b, while the outboard pad 52 is forced, if driven in the direct sense D, to follow a rotational movement in this same direct sense D by the bearing of the contact surface 64b on the contact surface 63b.

In the latter case, the natural driving of the caliper 3 by the pad 52 and the opposing effects of the caliper 3 and of the outboard pad 52 bearing on the carrier 2 therefore also generate a shear force between the caliper 3 and the pad 52, and allows better absorption of the braking torque.

As it is advantageous to combine the effects obtained by the invention in the case of relatively gentle braking torques and in the case of relatively high braking torques, it may be beneficial, as shown in FIGS. 3 and 4, to contrive for the downstream branch 22 of the caliper to have a pair 61a, 62b of first contact surfaces forming a dihedron P1a, P1b of mutual contact between the downstream branch and the jaw 32, and a pair 63a, 63b of third contact surfaces forming a dihedron P2a, P2b of mutual contact between the downstream branch and the outboard pad 52.

This being the case, the jaw 32 of the caliper preferably has, facing the downstream branch 22 of the carrier, a second pair of contact surfaces 62a, 62b each of which is capable of coming to bear on the dihedron P1a, P1b of mutual contact between the downstream branch 22 of the carrier and the jaw 32.

Likewise, it is advantageous to contrive for the downstream end 522 of the outboard pad 52 to have, facing the downstream branch 22 of the carrier, a pair of fourth contact surfaces 64a, 64b, each of which is capable of coming to bear on the dihedron P2a, P2b of mutual contact between the downstream branch 22 of the carrier and this outboard pad 52.

Brake balance can furthermore be improved by arranging the contact surfaces 61a, 61b of the carrier 2, and 62a, 62b of the jaw 3, exclusively on the outboard part 220 (FIG. 5) of the carrier and on the corresponding outboard part 320 (FIG. 2) of the jaw.

The effectiveness of the arrangement proposed may also be enhanced by attaching the upstream end 511, 521 of at least one of the inboard 51 and outboard 52 pads, and preferably of both pads, to the upstream branch 21 of the carrier, for example by means of complementary respective reliefs such as 212a and 521a (FIG. 4).

Finally, the effects of the invention may also be enhanced by contriving for the inboard pad 52 itself also to have a pair of contact surfaces capable of coming to bear on the carrier, these surfaces then being symmetric with respect to the disc 1 with the contact surfaces 64a, 64b of the outboard pad 52.

What is claimed is:

1. A disc brake for a motor vehicle, comprising: a disc having an inboard face and an outboard face, said disc rotating about a transverse axis in a direct sense of rotation when the vehicle is travelling forward; a carrier comprising an upstream branch and a downstream branch which straddles said disc and secured to a common base which is fixed to the vehicle facing said inboard face of said disc, said downstream branch extending from said upstream branch in the direct sense of rotation of said disc, said upstream and downstream branches each having an inboard housing and an outboard housing which are situated one on each side of said disc; a caliper which straddles said disc and mounted to slide relative to said carrier in a transverse direction parallel to said transverse axis, said caliper comprising a jaw which faces towards said outboard face of said disc, and a cylinder which faces towards said inboard face of said disc, said cylinder being closed by a piston; guide means provided on the carrier and on the caliper comprising a bore and a pin which slides in the bore; and first and second friction pads, said first friction pad forming an inboard pad which is located in the transverse direction, between said piston and the inboard face of the disc and said second friction pad forming an outboard pad which is located in a transverse direction between said outboard face of said disc and said jaw of said caliper, said inboard pad having an upstream end and a downstream end which are mounted to slide in respective inboard housings of said upstream and downstream branches and said outboard pad having an upstream end and a downstream end which are mounted to slide in the respective outboard housings of said upstream and downstream branches, said inboard and outboard pads carrying, between their respective upstream and downstream ends, respective friction linings which face towards said inboard and outboard faces of said disc and via which said first and second pads are urged by said disc in the direct sense of rotation in the event of braking while the vehicle is travelling forward, characterized in that: said pin is a single pin and lies on a mid-plane of said caliper; said downstream branch of said carrier and said jaw of said caliper have first and second respective contact surfaces capable which bear one on the other in a first oblique plane; said downstream branch of said carrier and at least one of said inboard and outboard pads have third and fourth respective contact surfaces which bear one on the other in a second oblique plane; and said first and second oblique planes form a non-zero angle between them.

2. The disc brake according to claim 1, characterized in that a spring bears on said outboard pad and jaw of said caliper to exerting an elastic torque which urges said caliper to turn in the direct sense of rotation relative to said outboard pad.

3. The disc brake according to claim 1, characterized in that said upstream end of at least one of said inboard and outboard pads is attached to said upstream branch of said carrier.

4. The disc brake according to claim 1, characterized in that said downstream branch of said carrier has a first pair of first contact surfaces forming a dihedron of mutual contact between said downstream branch and said jaw, and a third pair of third contact surfaces forming a dihedron of mutual contact between said downstream branch and said first pad.

5. The disc brake according to claim 4, characterized in that said jaw of the caliper has, facing the downstream branch of the carrier, a second pair of second contact surfaces which bear on the dihedron of mutual contact between said downstream branch of the carrier and said jaw.

6. The disc brake according to claim 4, characterized in that said downstream end of the first pad has a fourth pair of fourth contact surfaces which bear on the dihedron of mutual contact between said downstream branch of the carrier and said first pad.

7. The disc brake according to claim 1, characterized in that said angle formed between said first and second oblique planes is at least equal to 45 degrees.

* * * * *